(12) United States Patent
Cunningham et al.

(10) Patent No.: US 8,865,620 B2
(45) Date of Patent: Oct. 21, 2014

(54) HEAT-SENSITIVE COATING COMPOSITIONS BASED ON RESORCINYL TRIAZINE DERIVATIVES

(75) Inventors: Allan Francis Cunningham, Magden (CH); Thomas Ehlis, Freiburg (DE); Jean-Luc Birbaum, Binningen (CH); Pascal Hayoz, Hofstetten (CH); Kamalesh Pai Fondekar, Thane (IN)

(73) Assignee: Datalase, Ltd., Cheshire (GB)

( * ) Notice: Subject to any disclaimer, the term of this patent is extended or adjusted under 35 U.S.C. 154(b) by 1347 days.

(21) Appl. No.: 12/529,718

(22) PCT Filed: Mar. 5, 2008

(86) PCT No.: PCT/EP2008/052637
§ 371 (c)(1),
(2), (4) Date: Sep. 2, 2011

(87) PCT Pub. No.: WO2008/110487
PCT Pub. Date: Sep. 18, 2008

(65) Prior Publication Data
US 2011/0311786 A1 Dec. 22, 2011

(30) Foreign Application Priority Data
Mar. 15, 2007 (EP) ..................................... 07104184

(51) Int. Cl.
*B41M 5/333* (2006.01)
*C09D 5/26* (2006.01)
*C08K 5/3492* (2006.01)
*C09D 7/00* (2006.01)

(52) U.S. Cl.
CPC ............ *B41M 5/3335* (2013.01); *C09D 7/007* (2013.01); *C09D 5/26* (2013.01); *C08K 5/3492* (2013.01); *B41M 5/3336* (2013.01)
USPC ........ 503/201; 503/216; 106/31.17; 524/100; 544/216

(58) Field of Classification Search
CPC .. B41M 5/3335; B41M 5/3336; C09D 11/00; C09K 5/3492
USPC ................ 503/200–226; 106/31.17; 524/100; 544/216
See application file for complete search history.

(56) References Cited

U.S. PATENT DOCUMENTS

| | | | |
|---|---|---|---|
| 2,286,726 A | 6/1942 | Emerson | |
| 3,161,770 A | 12/1964 | Huett et al. | |
| 3,959,571 A | 5/1976 | Yahagi et al. | |
| 4,157,982 A | 6/1979 | Clemons et al. | |
| 4,446,324 A | 5/1984 | Graser | |
| 4,623,557 A | 11/1986 | Yamori et al. | |
| 4,680,598 A | 7/1987 | Obitsu et al. | |
| 4,820,683 A | 4/1989 | Vervacke et al. | |
| 4,861,620 A | 8/1989 | Azuma et al. | |
| 4,981,675 A | 1/1991 | Haase et al. | |

(Continued)

FOREIGN PATENT DOCUMENTS

CN 1537059 10/2004
DE 2 130 845 1/1972
(Continued)

OTHER PUBLICATIONS

English language abstract No. 1999-014073 of JP 10282657.
(Continued)

*Primary Examiner* — Bruce H Hess
(74) *Attorney, Agent, or Firm* — Stoel Rives, LLP

(57) ABSTRACT

The present invention provides heat-sensitive coating compositions, which comprise a color developer of formula (1) or mixtures thereof wherein $R^1$ can be hydrogen, $C_{1-20}$-alkyl, $C_{3-8}$-cycloalkyl, $C_{2-10}$-alkenyl, aryl or $SO_3H$, and $R^2$ and $R^3$ can be the same or different and can be hydrogen, halogen, $C_{1-20}$-alkyl, $C_{3-8}$-cyclo-alkyl, $C_{2-10}$-alkenyl, aryl, $OR^6$, $NR^7R^8$, $SR^9$, $SO_3H$ or $COOR^{10}$ and $R^4$ and $R^5$ can be the same or different, and can be hydrogen, halogen, $C_{1-20}$-alkyl, $C_{3-8}$-cyclo-alkyl, $C_{2-10}$-alkenyl, aryl, $OR^6$, $NR^7R^8$ or $SR^9$, $R^6$, $R^7$, $R^8$, $R^9$ and $R^{10}$ can be the same or different and can be hydrogen, $C_{1-30}$-alkyl, $C_{3-8}$-cycloalkyl, $C_{2-10}$-alkenyl or aryl, wherein $C_{1-20}$-alkyl can be unsubstituted or substituted with one or more $C_{3-8}$-cycloalkyl, $C_{2-10}$-alkenyl, phenyl, halogen, $OR^{11}$, $NR^{12}R^{13}$, $SR^{14}$, $SO_3H$ or $COOR^{15}$, and aryl can be unsubstituted or substituted with one or more halogen, $C_{1-10}$-alkyl, halogenated $C_{1-10}$-alkyl, $C_{3-8}$-cycloalkyl $C_{2-10}$-alkenyl, phenyl, $OR^{11}$, $NR^{12}R^{13}$, $SR^{14}$, $SO_3H$ or $COOR^{15}$, wherein $R^{11}$, $R^{12}$, $R^{13}$, $R^{14}$ and $R^{15}$ can be the same or different and can be hydrogen, $C_{1-10}$-alkyl, $C_{3-8}$-cycloalkyl or $C_{2-10}$-alkenyl, a process for the preparation of these compositions, a process of coating substrates with these compositions, substrates coated with these compositions, a process for preparing marked substrates using these compositions, marked substrates obtainable by the latter process, and certain color developers.

26 Claims, No Drawings

(56) References Cited

U.S. PATENT DOCUMENTS

| | | |
|---|---|---|
| 5,028,643 A | 7/1991 | Jaffe |
| 5,075,195 A | 12/1991 | Bäbler et al. |
| 5,166,350 A | 11/1992 | Bedekovic et al. |
| 5,171,624 A | 12/1992 | Walter |
| 5,329,006 A * | 7/1994 | Baumann et al. .......... 544/252 |
| 5,354,633 A | 10/1994 | Lewis et al. |
| 5,380,694 A | 1/1995 | Krebs |
| 5,413,629 A | 5/1995 | Yasui et al. |
| 5,446,011 A | 8/1995 | Hayakawa et al. |
| 5,470,502 A | 11/1995 | Hahn et al. |
| 5,718,754 A | 2/1998 | Macpherson et al. |
| 5,721,190 A | 2/1998 | Miyamoto et al. |
| 5,733,414 A | 3/1998 | Stockwell |
| 5,879,855 A | 3/1999 | Schädeli et al. |
| 5,888,283 A | 3/1999 | Mehta et al. |
| 5,897,938 A | 4/1999 | Shinmoto et al. |
| 6,022,905 A | 2/2000 | Harris et al. |
| 6,054,021 A | 4/2000 | Kurrle et al. |
| 6,174,586 B1 | 1/2001 | Peterson |
| 6,210,472 B1 | 4/2001 | Kwan et al. |
| 6,274,065 B1 | 8/2001 | Deno et al. |
| 6,290,765 B1 | 9/2001 | Jaycock et al. |
| 6,306,493 B1 | 10/2001 | Brownfield |
| 6,335,783 B1 | 1/2002 | Kruit |
| 6,372,394 B1 | 4/2002 | Zientek |
| 6,372,819 B1 | 4/2002 | Mizobuchi et al. |
| 6,475,695 B2 | 11/2002 | Kuroki et al. |
| 6,596,386 B1 | 7/2003 | Reck et al. |
| 6,677,273 B2 | 1/2004 | Torii et al. |
| 6,706,785 B1 | 3/2004 | Fu |
| 6,906,735 B2 | 6/2005 | Bhatt et al. |
| 7,144,676 B2 | 12/2006 | Barr et al. |
| 7,597,961 B2 | 10/2009 | Maruvada et al. |
| 8,021,820 B2 | 9/2011 | O'Donoghue et al. |
| 8,101,544 B2 | 1/2012 | O'Donoghue et al. |
| 8,178,277 B2 | 5/2012 | Campbell et al. |
| 2001/0006757 A1 | 7/2001 | Fukino et al. |
| 2002/0155291 A1 | 10/2002 | Daga et al. |
| 2003/0104938 A1 | 6/2003 | Torii et al. |
| 2003/0228439 A1 | 12/2003 | Kawakami |
| 2004/0106163 A1 | 6/2004 | Workman et al. |
| 2004/0157947 A1 | 8/2004 | Heneghan |
| 2004/0242414 A1 | 12/2004 | Morita et al. |
| 2005/0119368 A1 | 6/2005 | Hall-Goulle et al. |
| 2005/0148467 A1 | 7/2005 | Makitalo et al. |
| 2005/0186511 A1 | 8/2005 | Khan |
| 2006/0040217 A1 | 2/2006 | Stubbs |
| 2006/0072437 A1 | 4/2006 | Shiono et al. |
| 2006/0094599 A1 | 5/2006 | Kuboyama et al. |
| 2006/0147842 A1 | 7/2006 | Khan |
| 2006/0154818 A1 | 7/2006 | Destro et al. |
| 2006/0155007 A1 | 7/2006 | Huber |
| 2007/0082139 A1 | 4/2007 | Dermeik et al. |
| 2007/0087292 A1 | 4/2007 | Day et al. |
| 2007/0098900 A1 | 5/2007 | Abe et al. |
| 2007/0218206 A1 | 9/2007 | Reichert et al. |
| 2008/0023164 A1 | 1/2008 | Fredlund et al. |
| 2008/0207444 A1 | 8/2008 | O'Donoghue et al. |
| 2009/0107645 A1 | 4/2009 | Legnerfalt et al. |
| 2009/0191420 A1 | 7/2009 | O'Donoghue et al. |
| 2009/0220749 A1 | 9/2009 | O'Donoghue et al. |
| 2010/0104825 A1 | 4/2010 | Campbell et al. |
| 2010/0279079 A1 | 11/2010 | Campbell et al. |
| 2010/0304166 A1 | 12/2010 | Kaser et al. |
| 2011/0065576 A1 | 3/2011 | Campbell et al. |
| 2011/0183126 A1 | 7/2011 | Walker et al. |
| 2012/0045624 A1 | 2/2012 | Campbell et al. |

FOREIGN PATENT DOCUMENTS

| | | |
|---|---|---|
| DE | 1 670 332 | 3/1972 |
| DE | 4407905 | 9/1995 |
| DE | 19704478 | 8/1998 |
| EP | 0 165 608 | 12/1985 |
| EP | 0 187 329 | 7/1986 |
| EP | 0187329 | 7/1986 |
| EP | 0319283 | 6/1989 |
| EP | 0372715 | 6/1990 |
| EP | 0 546 577 | 6/1993 |
| EP | 0600441 | 6/1994 |
| EP | 0637514 | 2/1995 |
| EP | 0659583 | 6/1995 |
| EP | 0 704 437 | 4/1996 |
| EP | 0754564 | 1/1997 |
| EP | 0792756 | 9/1997 |
| EP | 0894896 | 2/1999 |
| EP | 0 941 989 | 9/1999 |
| EP | 0 949 251 | 10/1999 |
| EP | 1208995 | 5/2002 |
| EP | 1295730 | 3/2003 |
| EP | 1367437 | 12/2003 |
| EP | 1645430 | 4/2006 |
| GB | 1 347 647 | 2/1974 |
| GB | 1 389 716 | 4/1975 |
| GB | 2 002 801 | 2/1979 |
| GB | 1 548 059 | 7/1979 |
| GB | 2 154 597 | 9/1985 |
| JP | 61-022988 | 1/1986 |
| JP | 63-172689 | 7/1988 |
| JP | 1232093 | 9/1989 |
| JP | 02044562 | 2/1990 |
| JP | 02293181 A | 12/1990 |
| JP | 7017134 | 1/1995 |
| JP | 08267915 A | 10/1996 |
| JP | 9-156228 | 6/1997 |
| JP | 09-254552 | 9/1997 |
| JP | 10282657 A | 10/1998 |
| JP | 11-048618 | 2/1999 |
| JP | 11-115317 | 4/1999 |
| JP | 2000/200830 | 7/2000 |
| JP | 2003/276334 | 9/2003 |
| JP | 2004/045549 | 2/2004 |
| JP | 2004/160806 | 6/2004 |
| JP | 2005/022366 | 1/2005 |
| JP | 2005305872 A | 11/2005 |
| JP | 2006/021500 | 1/2006 |
| JP | 2006/291082 | 10/2006 |
| JP | 2007/125578 | 5/2007 |
| WO | WO 97/10307 | 3/1997 |
| WO | WO 00/35679 | 6/2000 |
| WO | WO 02/068205 | 9/2002 |
| WO | WO 02/074548 | 9/2002 |
| WO | WO 02/100914 | 12/2002 |
| WO | WO 2004/043704 | 5/2004 |
| WO | WO 2005/012442 | 2/2005 |
| WO | WO 2005/054576 | 6/2005 |
| WO | WO 2005/068207 | 7/2005 |
| WO | WO 2005/108103 | 11/2005 |
| WO | WO 2006/041401 | 4/2006 |
| WO | WO 2006/052843 | 5/2006 |
| WO | WO 2006/061343 | 6/2006 |
| WO | WO 2006/067073 | 6/2006 |
| WO | WO 2006/069653 | 7/2006 |
| WO | WO 2006/129078 | 12/2006 |
| WO | WO 2006/129086 | 12/2006 |
| WO | WO 2007/012578 | 2/2007 |
| WO | WO 2007/031454 | 3/2007 |
| WO | WO 2007/057367 | 5/2007 |
| WO | WO 2007/088104 | 8/2007 |
| WO | WO 2008/055796 | 5/2008 |
| WO | WO 2010/049281 | 5/2010 |

OTHER PUBLICATIONS

English language abstract No. 1996-514088 of JP 08267915.
English language abstract No. 1991-0195565 of JP 2293181.
English language abstract No. 2005-789475 of JP 2005305872.
Ninagawa et al., "Formaldehyde Polymers, 26$^{a)}$: Syntheses and Condensations of Substituted Triphenoxy and Triphenyl Derivatives of 1,3,5-Triazine," Makromol. Chem., 180, pp. 2123-2131, (1979).
Anklam, E., "A review of the analytical methods to determine the geographical and botanical origin of honey," Food Chemistry vol. 63, No. 4, pp. 549-562, (1998).

(56) References Cited

OTHER PUBLICATIONS

Howbert, et al., "Novel Agents Effective against Solid Tumors: The Diarylsulfonylureas. Synthesis, Activities, and Analysis of Quantitative Structure-Activity Relationships," J. Med. Chem., vol. 33, Issue. 9, pp. 2393-2407, (1990).
Kurzer, F., "Sulfonylureas and Sulfonylthioureas," Chem. Rev., vol. 50, Issue. 1, pp. 1-46, (1952).
Ulrich, H., "The Chemistry of Sulfonylisocyanates," Chem. Rev., vol. 65, Issue. 365, pp. 369-376, (1965).
Knepper, T.P., "Synthetic chelating agents and compounds exhibiting complexing properties in the aquatic environment," Trends in Analytical Chemistry, vol. 22, No. 10, pp. 708-724, (2003).
"Honey," Wikipedia, http://en.wikipedia.org/wiki/Honey, 16 pgs., (retrieved Sep. 28, 2010).
Preliminary Amendment filed Jun. 20, 2007 in U.S. Appl. No. 11/793,499.
Office Action issued May 12, 2011 in U.S. Appl. No. 11/793,499.
Response to Office Action filed Aug. 8, 2011 in U.S. Appl. No. 11/793,499.
Notice of Allowance issued Sep. 26, 2011 in U.S. Appl. No. 11/793,499.
International Search Report issued May 11, 2006 in International Application No. PCT/EP2005/056763.
Written Opinion of the International Search Authority issued Jun. 26, 2007 in International Application No. PCT/EP2005/056763.
International Preliminary Report on Patentability issued Jun. 26, 2007 in International Application No. PCT/EP2005/056763.
EPO Communication issued Oct. 11, 2013 in EP Patent Application No. EP 2005819361.
Response to EPO Communication filed Apr. 17, 2014 in EP Application No. 2005819361.
Preliminary Amendment filed Jul. 15, 2008 in U.S. Appl. No. 12/087,806.
Office Action issued Dec. 8, 2010 in U.S. Appl. No. 12/087,806.
Response to Office Action filed Apr. 6, 2011 in U.S. Appl. No. 12/087,806.
Notice of Allowance issued Jun. 15, 2011 in U.S. Appl. No. 12/087,806.
International Search Report issued May 7, 2007 in International Application No. PCT/EP2007/050421.
Written Opinion of the International Search Authority issued Jul. 31, 2008 in International Application No. PCT/EP2007/050421.
International Preliminary Report on Patentability issued Aug. 5, 2008 in International Application No. PCT/EP2007/050421.
EPO Communication issued Sep. 3, 2010 in European Patent Application No. EP 2007712043.
Response to EPO Communication filed Dec. 20, 2010 in European Patent Application No. EP 2007712043.
EPO Communication issued Dec. 1, 2011 in European Patent Application No. EP 2007712043.
Response to EPO Communication filed Jul. 18, 2012 in European Patent Application No. EP 2007712043.
Preliminary Amendment filed Jun. 16, 2009 in U.S. Appl. No. 12/519,423.
Office Action issued Jun. 24, 2011 in U.S. Appl. No. 12/519,423.
Response to Office Action filed Oct. 20, 2011 in U.S. Appl. No. 12/519,423.
Office Action issued Nov. 21, 2011 in U.S. Appl. No. 12/519,423.
Response to Office Action filed Dec. 20, 2011 in U.S. Appl. No. 12/519,423.
Notice of Allowance issued Jan. 17, 2012 in U.S. Appl. No. 12/519,423.
Response to Office Action filed Apr. 6, 2012 in U.S. Appl. No. 12/519,423.
Office Action issued Apr. 9, 2012 in U.S. Appl. No. 12/519,423.
International Search Report issued Feb. 27, 2008 in International Application No. PCT/EP2007/064408.
International Preliminary Report on Patentability issued Jul. 14, 2009 in International Application No. PCT/EP2007/064408.
Written Opinion issued Jul. 9, 2009 in International Application No. PCT/EP2007/064408.
EPO Communication issued Nov. 17, 2009 in EP Patent Application No. 2007858026.
Response to EPO Communication filed Mar. 3, 2010 in EP Patent Application No. 2007858026.
EPO Communication issued Mar. 24, 2010 in EP Patent Application No. 2007858026.
Response to EPO Communication filed Sep. 28, 2010 in EP Patent Application No. 2007858026.
EPO Communication issued Aug. 18, 2011 in EP Patent Application No. 2007858026.
Response to EPO Communication filed Sep. 8, 2011 in EP Patent Application No. 2007858026.
EPO Communication issued Feb. 14, 2012 in EP Patent Application No. 2007858026.
Response to EPO Communication filed Mar. 1, 2012 in EP Patent Application No. 2007858026.
EPO Communication issued Apr. 3, 2012 in EP Patent Application No. 2007858026.
Response to EPO Communication filed May 4, 2012 in EP Patent Application No. 2007858026.
EPO Communication issued Oct. 10, 2013 in EP Patent Application No. 2007858026.
Response to EPO Communication filed Apr. 15, 2014 in EP Patent Application No. 2007858026.
Preliminary Amendment filed Aug. 24, 2009 in U.S. Appl. No. 12/528,352.
Office Action issued Dec. 14, 2011 in U.S. Appl. No. 12/528,352.
International Search Report issued May 20, 2008 in International Application No. PCT/EP2008/052332.
International Preliminary Report on Patentability issued Sep. 8, 2009 in International Application No. PCT/EP2008/052332.
Written Opinion issued Sep. 8, 2009 in International Application No. PCT/EP2008/052332.
EPO Communication issued Dec. 23, 2009 in EP Application No. 2008717151.
Response to EPO Communication filed Jun. 30, 2010 in EP Application No. 2008717151.
EPO Communication issued Jul. 27, 2010 in EP Application No. 2008717151.
Response to EPO Communication filed Nov. 26, 2010 in EP Application No. 2008717151.
EPO Communication issued Dec. 23, 2010 in EP Application No. 2008717151.
Response to EPO Communication filed Apr. 8, 2011 in EP Application No. 2008717151.
EPO Communication issued May 10, 2011 in EP Application No. 2008717151.
International Search Report issued Aug. 5, 2008 in International Application No. PCT/EP2008/052637.
International Preliminary Report on Patentability issued Sep. 15, 2009 in International Application No. PCT/EP2008/052637.
Written Opinion issued Sep. 15, 2009 in International Application No. PCT/EP2008/052637.
EPO Communication issued Dec. 17, 2009 in EP Application No. 2008717393.
Response to EPO Communication filed Jun. 16, 2010 in EP Application No. 2008717393.
Preliminary Amendment filed Feb. 1, 2010 in U.S. Appl. No. 12/671,547.
Office Action issued Aug. 1, 2012 in U.S. Appl. No. 12/671,547.
Response to Office Action filed Oct. 25, 2012 in U.S. Appl. No. 12/671,547.
Office Action issued Jan. 31, 2013 in U.S. Appl. No. 12/671,547.
Response to Office Action filed Jul. 1, 2013 in U.S. Appl. No. 12/671,547.
Office Action issued Jul. 17, 2013 in U.S. Appl. No. 12/671,547.
Response to Office Action filed Jul. 30, 2013 in U.S. Appl. No. 12/671,547.
Office Action issued May 15, 2014 in U.S. Appl. No. 12/671,547.
International Search Report issued Oct. 21, 2008 in International Application No. PCT/EP2008/060550.

(56) References Cited

OTHER PUBLICATIONS

International Preliminary Report on Patentability issued Feb. 24, 2010 in International Application No. PCT/EP2008/060550.
Written Opinion issued Feb. 22, 2010 in International Application No. PCT/EP2008/060550.
EPO Communication issued Jul. 15, 2010 in EP Application No. 2008787124.
Response to EPO Communication filed Nov. 17, 2010 in EP Application No. 2008787124.
Preliminary Amendment filed Apr. 13, 2010 in U.S. Appl. No. 12/682,792.
Office Action issued Aug. 10, 2012 in U.S. Appl. No. 12/682,792.
Response to Office Action filed Dec. 10, 2012 in U.S. Appl. No. 12/682,792.
Office Action issued Feb. 6, 2013 in U.S. Appl. No. 12/682,792.
Response to Office Action filed Jul. 8, 2013 in U.S. Appl. No. 12/682,792.
Office Action issued Jul. 29, 2013 in U.S. Appl. No. 12/682,792.
Response to Office Action filed Oct. 29, 2013 in U.S. Appl. No. 12/682,792.
Office Action issued Dec. 18, 2013 in U.S. Appl. No. 12/682,792.
International Search Report issued Feb. 12, 2009 in International Application No. PCT/EP2008/064166.
International Preliminary Report on Patentability issued May 11, 2010 in International Application No. PCT/EP2008/064166.
Written Opinion issued May 7, 2010 in International Application No. PCT/EP2008/064166.
EPO Communication issued Apr. 5, 2013 in EP Application No. 2008848155.
Response to EPO Communication issued Jul. 5, 2013 in EP Application No. 2008848155.
Preliminary Amendment filed Apr. 11, 2011 in U.S. Appl. No. 13/123,607.
Office Action issued Jun. 17, 2013 in U.S. Appl. No. 13/123,607.
Response to Office Action filed Sep. 17, 2013 in U.S. Appl. No. 13/123,607.
Office Action issued Oct. 1, 2013 in U.S. Appl. No. 13/123,607.
Response to Office Action filed Mar. 31, 2014 in U.S. Appl. No. 13/123,607.
International Search Report issued Dec. 3, 2009 in International Application No. PCT/EP2009/063520.
International Preliminary Report on Patentability issued May 3, 2011 in International Application No. PCT/EP2009/063520.
Written Opinion issued Apr. 27, 2011 in International Application No. PCT/EP2009/063520.
EPO Communication issued Jul. 4, 2011 in European Application No. 09737404.
Response to the EPO Communication filed Jul. 19, 2011 in European Application No. 09737404.
Office Action issued Aug. 9, 2010 in U.S. Appl. No. 11/978,764.
Response to Office Action filed Nov. 9, 2010 in U.S. Appl. No. 11/978,764.
Office Action issued Dec. 16, 2010 in U.S. Appl. No. 11/978,764.
Office Action issued Feb. 1, 2011 in U.S. Appl. No. 11/978,764.
Response to Office Action filed May 2, 2011 in U.S. Appl. No. 11/978,764.
Office Action issued May 12, 2011 in U.S. Appl. No. 11/978,764.

* cited by examiner

HEAT-SENSITIVE COATING COMPOSITIONS BASED ON RESORCINYL TRIAZINE DERIVATIVES

The present invention refers to heat-sensitive coating compositions for marking substrates, to a process for the preparation of these compositions, to a process of coating substrates with these compositions, to substrates coated with these compositions, to a process for preparing marked substrates using these compositions, to marked substrates obtainable by the latter process, and to certain colour developers.

Heat sensitive coatings in which the mechanism of image formation is dependent on the thermal reaction between a colour-forming substance and a colour developer are well known.

Today, such heat-sensitive coatings have many diverse uses that include fax transmissions, Point of Sales (POS) receipts, bank statements, Automated Teller Machine (ATM) printouts, delivery and grocery labels, and transportation, lottery and entertainment tickets.

A common problem with typical heat-sensitive coating compositions used to prepare heat-sensitive coatings is that rapid discolouring occurs upon storage in the wet state at room temperature or slightly elevated temperature. Thus the heat-sensitive coating composition has either to be prepared immediately before use or one of the reactive components has to be modified in some way to render it less reactive, for example through microencapsulation.

It is an object of the present invention to provide heat-sensitive coating compositions, which are storage stable, i.e. only undergo minimal darkening (yellowing) upon storage in the wet state at room temperature or even slightly elevated temperature, and which also provide images of high contrast and of high stability towards heat, oil and light.

This object is solved by the composition of claim 1, the processes of claims 8, 9 and 11, the substrates of claims 10 and 13, and the colour developers of claims 14, 15 and 16.

The coating composition of the present invention comprises a colour developer of formula

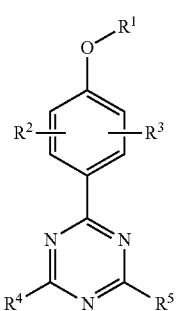

(1)

or mixtures thereof
wherein
$R^1$ can be hydrogen, $C_{1-20}$-alkyl, $C_{3-8}$-cycloalkyl, $C_{2-10}$-alkenyl, aryl or $SO_3H$, and
$R^2$ and $R^3$ can be the same or different and can be hydrogen, halogen, $C_{1-20}$-alkyl, $C_{3-8}$-cyclo-alkyl, $C_{2-10}$-alkenyl, aryl, $OR^6$, $NR^7R^8$, $SR^9$, $SO_3H$ or $COOR^{10}$ and
$R^4$ and $R^5$ can be the same or different, and can be hydrogen, halogen, $C_{1-20}$-alkyl, $C_{3-8}$-cyclo-alkyl, $C_{2-10}$-alkenyl, aryl, $OR^6$, $NR^7R^8$ or $SR^9$, $R^6$, $R^7$, $R^8$, $R^9$ and $R^{10}$ can be the same or different and can be hydrogen, $C_{1-30}$-alkyl, $C_{3-8}$-cycloalkyl, $C_{2-10}$-alkenyl or aryl,
wherein
$C_{1-20}$-alkyl can be unsubstituted or substituted with one or more $C_{3-8}$-cycloalkyl, $C_{2-10}$-alkenyl, phenyl, halogen, $OR^{11}$, $NR^{12}R^{13}$, $SR^{14}$, $SO_3H$ or $COOR^{15}$, and
aryl can be unsubstituted or substituted with one or more halogen, $C_{1-10}$-alkyl, halogenated $C_{1-10}$-alkyl, $C_{3-8}$-cycloalkyl, $C_{2-10}$-alkenyl, phenyl, $OR^{11}$, $NR^{12}R^{13}$, $SR^{14}$, $SO_3H$ or $COOR^{15}$,
wherein
$R^{11}$, $R^{12}$, $R^{13}$, $R^{14}$ and $R^{15}$ can be the same or different and can be hydrogen, $C_{1-10}$-alkyl, $C_{3-8}$-cycloalkyl or $C_{2-10}$-alkenyl.

Examples of $C_{1-10}$-alkyl are methyl, ethyl, propyl, isopropyl, butyl, isobutyl, sec-butyl, tert-butyl, pentyl, hexyl, heptyl, octyl, nonyl and decyl. Preferably, $C_{1-10}$-alkyl is $C_{1-4}$-alkyl. $C_{1-4}$-alkyl can be methyl, ethyl, propyl, isopropyl, butyl, isobutyl, sec-butyl or tert-butyl.

An example of a halogenated $C_{1-10}$-alkyl is trifluoromethyl.

Examples of $C_{1-20}$-alkyl are methyl, ethyl, propyl, isopropyl, butyl, isobutyl, sec-butyl, tert-butyl, pentyl, hexyl, heptyl, octyl, nonyl, decyl, dodecyl, tetradecyl, heptadecyl, octadecyl and eicosyl. Preferably, $C_{1-20}$-alkyl is $C_{1-6}$-alkyl. $C_{1-6}$-alkyl can be methyl, ethyl, propyl, isopropyl, butyl, isobutyl, sec-butyl, tert-butyl, pentyl or hexyl.

Examples of $C_{1-30}$-alkyl are methyl, ethyl, propyl, isopropyl, butyl, isobutyl, sec-butyl, tert-butyl, pentyl, hexyl, heptyl, octyl, nonyl, decyl, dodecyl, tetradecyl, heptadecyl, octadecyl, eicosyl, heneicosyl, docosyl, tricosyl, pentacosyl, heptacosyl and triacontyl.

Examples of $C_{3-8}$-cycloalkyl are cyclopropyl, cyclobutyl, cyclopentyl, cyclohexyl, cycloheptyl and cyclooctyl.

Examples of $C_{2-10}$-alkenyl are allyl, 2-butenyl and 3-hexenyl.

Examples of aryl are phenyl, naphthyl, pyrrolyl and pyridyl. Preferred aryls are phenyl and pyrrolyl.

Halogen can be fluorine, chlorine or bromine.

Examples of colour developers of formula 1 are

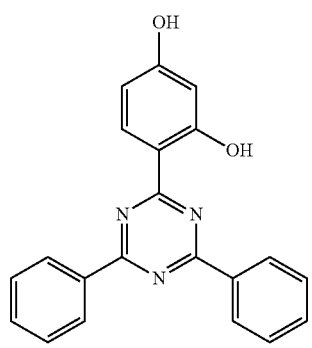

(1a)

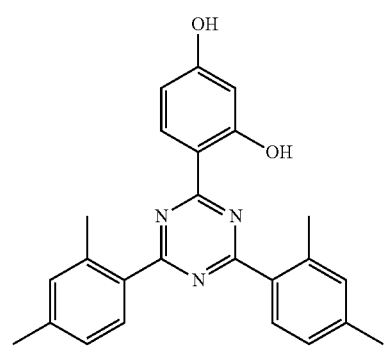
(1b)
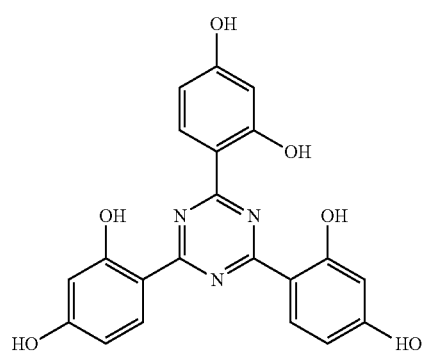
(1c)
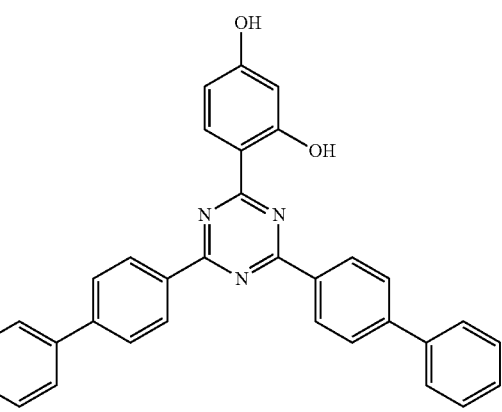
(1d)
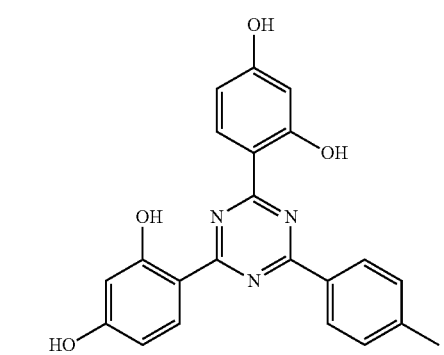
(1e)
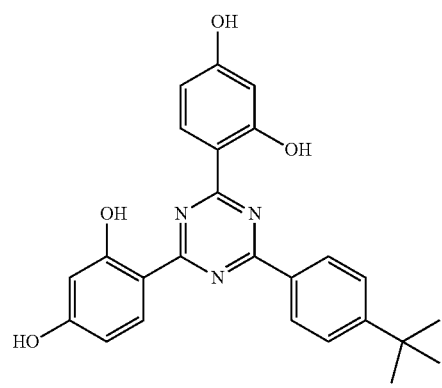
(1f)
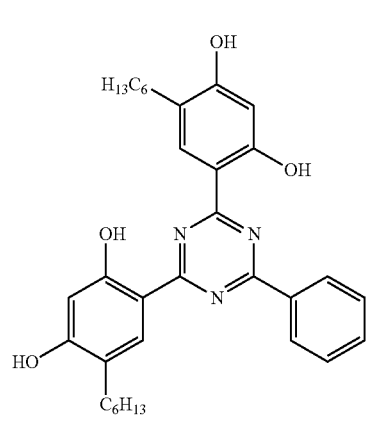
(1g)
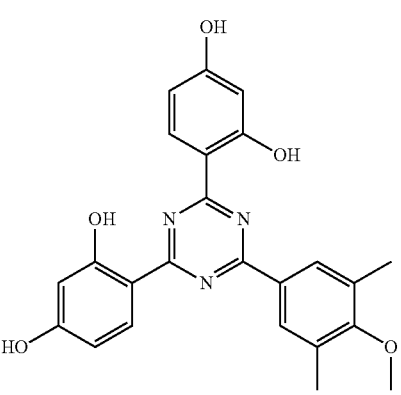
(1h)
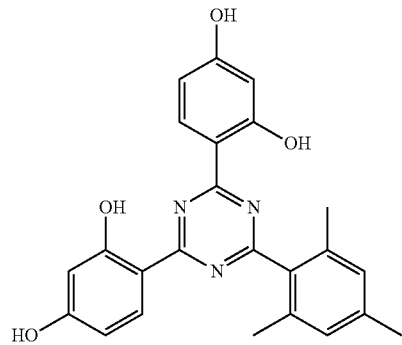
(1i)

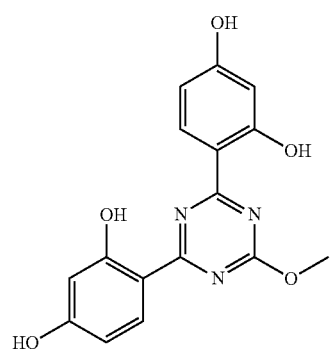
(1j)
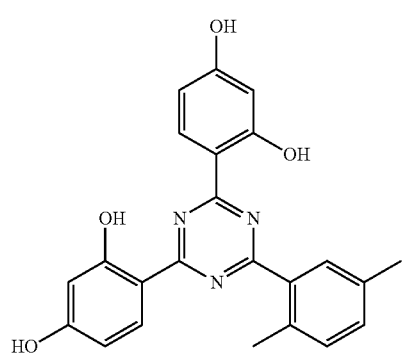
(1k)
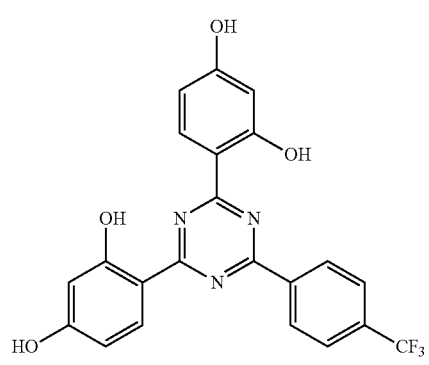
(1l)
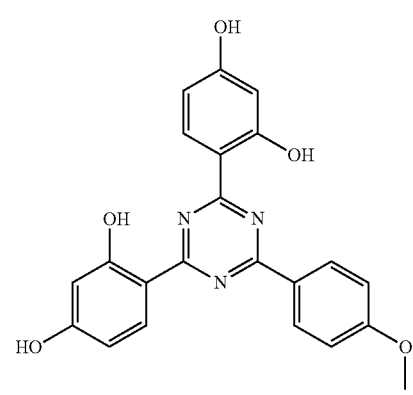
(1m)
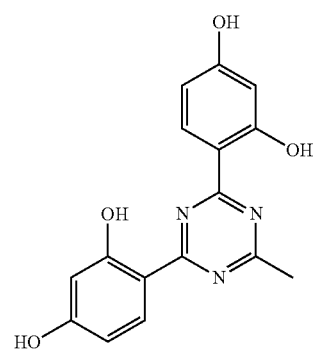
(1n)
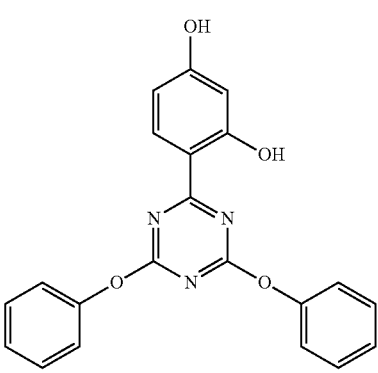
(1o)
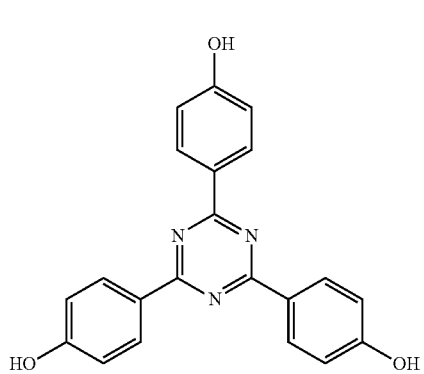
(1p)
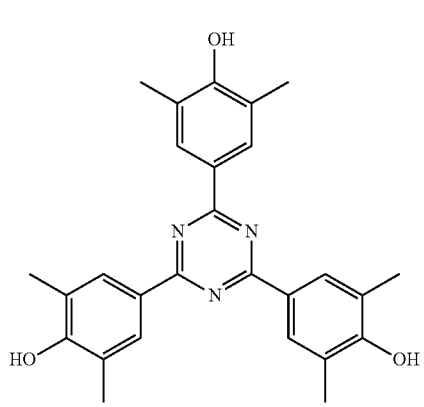
(1q)

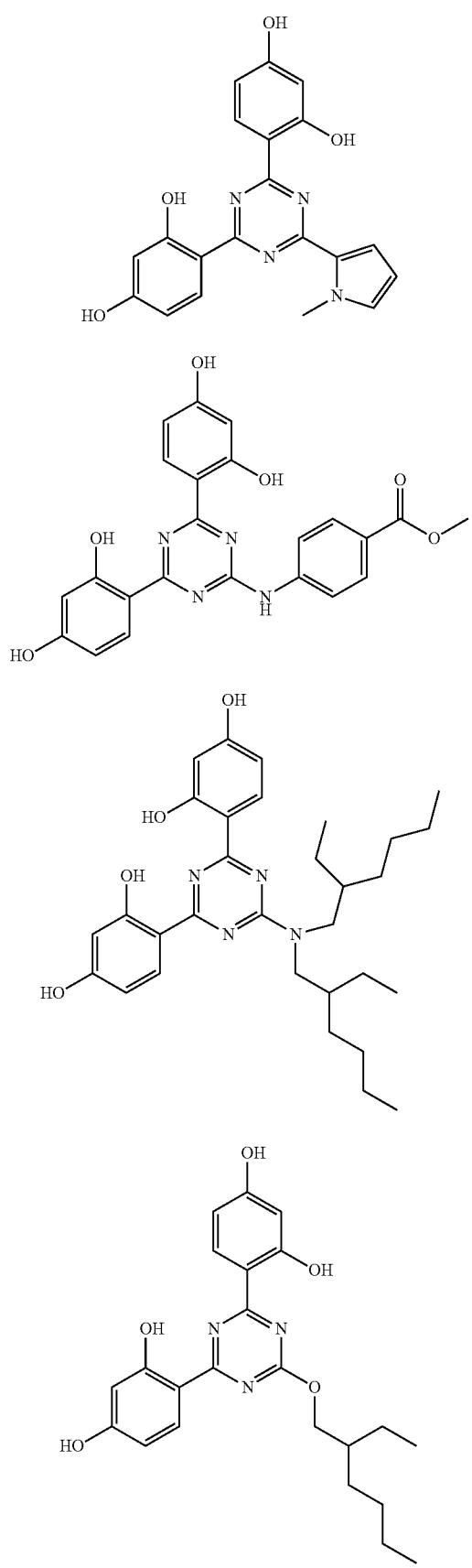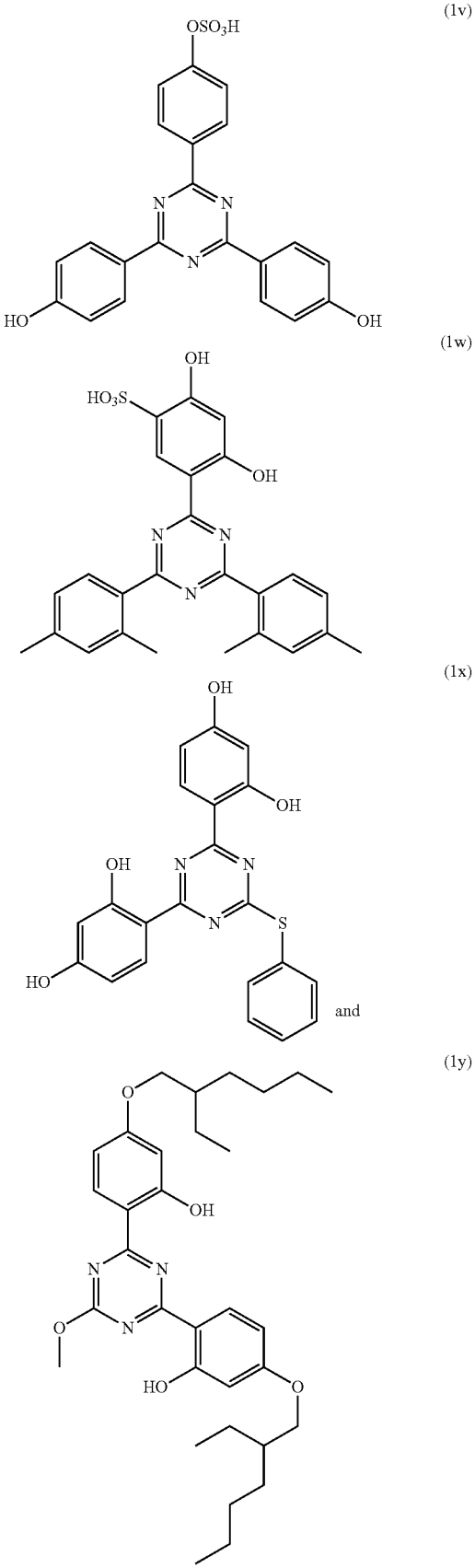

In preferred colour developers of formula

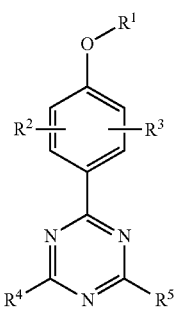

(1)

R¹ is hydrogen, $C_{2-10}$-alkenyl, aryl or $SO_3H$, and
R² and R³ can be the same or different and are hydrogen, $C_{1-20}$-alkyl, aryl, $OR^6$, $NR^7R^8$, $SR^9$, $SO_3H$ or $COOR^{15}$ and
R⁴ and R⁵ can be the same or different, and are hydrogen, $C_{1-20}$-alkyl, aryl, $OR^6$, $NR^7R^8$ or $SR^9$,
$R^6$, $R^7$, $R^8$, $R^9$ and $R^{10}$ can be the same or different and are hydrogen, $C_{1-30}$-alkyl or aryl,
wherein
$C_{1-20}$-alkyl can be unsubstituted or substituted with one or more phenyl, $OR^{11}$, $NR^{12}R^{13}$, $SR^{14}$, $SO_3H$ or $COOR^{15}$, and
aryl can be unsubstituted or substituted with one or more $C_{1-10}$-alkyl, halogenated $C_{1-10}$-alkyl, $OR^{11}$, $NR^{12}R^{13}$, $SR^{14}$, $SO_3H$ or $COOR^{15}$,
wherein
$R^{11}$, $R^{12}$, $R^{13}$, $R^{14}$ and $R^{15}$ can be the same or different and can be hydrogen or $C_{1-10}$-alkyl.

In more preferred colour developers of formula

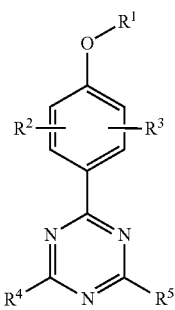

(1)

R¹ is hydrogen and
R² and R³ can be the same or different and are hydrogen, $C_{1-20}$-alkyl, $OR^6$ or $SO_3H$ and
R⁴ and R⁵ can be the same or different, and are $C_{1-20}$-alkyl, aryl, $OR^6$, $NR^7R^9$ or $SR^9$,
$R^6$, $R^7$, $R^8$ and $R^9$ can be the same or different and are hydrogen, $C_{1-30}$-alkyl or aryl,
wherein
$C_{1-20}$-alkyl is unsubstituted and
aryl can be unsubstituted or substituted with one or more $C_{1-10}$-alkyl, halogenated $C_{1-10}$-alkyl, $OR^{11}$, $SO_3H$ or $COOR^{15}$,
wherein
$R^{11}$ and $R^{15}$ can be the same or different and can be hydrogen or $C_{1-10}$-alkyl.

In even more preferred colour developers of formula

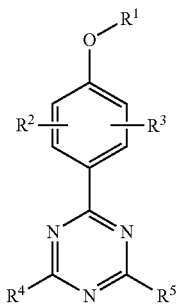

(1)

R¹ is hydrogen and
R² and R³ can be the same or different and are hydrogen and
R⁴ and R⁵ can be the same or different, and are aryl,
wherein
aryl can be unsubstituted or substituted with one or more $OR^{11}$,
wherein
$R^{11}$ is hydrogen.

The most preferred colour developer is the colour developer of formula 1p.

Most colour developers of formula 1 are known in the art and/or can be prepared by known methods.

2,4,6-Tris(2,4-dihydroxyphenyl)-s-triazine (1c), for example, can be prepared by reacting cyanuric chloride with resorcinol as outlined in example 1 of EP 0 941 989 A2. 1q can be prepared in analogy by reacting cyanuric chloride with 2,6-dimethylphenol. 1p can be prepared by the cyclotrimerization of 4-hydroxybenzonitrile according to the procedure of Ninagawa et al Makromol. Chem. 1979, 180, 2123.

2-(2,4-dihydroxyphenyl)-s-triazine derivatives such as 1a, 1b, 1d, 1o or 1y can be prepared from the corresponding 2-chloro-s-triazine derivative and resorcinol. 4,6-Diphenyl-2-(2,4-di-hydroxyphenyl)-s-triazine (1a), for example, can be prepared from 4,6-diphenyl-2-chloro-s-triazine and resorcinol as described in example 14 of EP 0941 989 A2; and 4,6-bis(2,4-di-methylphenyl)-2-(2,4-dihydroxyphenyl)-s-triazine (1b), for example, can be prepared from 4,6-bis(2,4-dimethylphenyl)-2-chloro-s-triazine and resorcinol as described in example 3 of EP 0 941 989 A2. The preparation of 10 is described in example 23 of DE 1 670 332.

2,4-Bis(2,4-dihydroxyphenyl)-s-triazine derivatives such as 1e, 1f, 1g, 1h, 1i, 1j, 1k, 1l, 1m, 1n, 1r, 1s or 1x can be prepared by reacting the corresponding 2,4-dichloro-s-triazine derivative or 2,4-diphenoxy-s-triazine derivative with resorcinol or substituted resorcinol. 2,4-Bis(2,4-dihydroxy-5-hexylphenyl)-6-phenyl-s-triazine (1g), for example, can be prepared from 2,4-dichloro-6-phenyl-s-triazine and 4-hexyl-resorcinol as described in example 62 of EP 0 704 437 A2; and 2,4-bis(2,4-di-hydroxyphenyl)-6-(2,4,6-trimethylphenyl)-s-triazine (1i), for example, can be prepared from 2,4-diphenoxy-6-(2,4,6-trimethylphenyl)-s-triazine and resorcinol as described in example 17 of EP 0 941 989 A2. 1s, for example, can be prepared as described in EP 0 165 608 A2 (compound 113, table 1). 1u, for example, can be prepared as described in example 2b of EP 0 949 251 A1. 1x, for example, can be prepared as described in example 2 of EP 0 165 608 A2.

1v can be prepared by as described in Ninagawa et al Makromol. Chem. 1979, 180, 2123.

1w can be prepared by reacting 1b with sulphuric acid at 65 to 70° C.

The coating composition can comprise further colour developers known in the art, but the coating composition can also not include further colour developers beside the colour developer of formula 1 or mixtures thereof.

Examples of further colour developers known in the art are N-(p-toluenesulfonyl)-N'-(3-p-toluenesulfonyloxy)phenyl) urea, 4-hydroxy-4'-isopropoxydiphenyl sulfone and 2,4'-dihydroxydiphenyl sulfone.

The colour developer of formula 1 or mixtures thereof can be microencapsulated by techniques known in the art, but the colour developer of formula 1 or mixtures thereof can also not be microencapsulated as this is not necessary in order to prevent darkening (yellowing) upon storage in the wet state at room temperature or even slightly elevated temperature.

The coating composition of the present invention can also comprise a colour former or a mixture of colour formers.

The colour former can be any suitable colour former such as a phthalide, a fluoran, a triarylmethane, a benzoxazine, a quinazoline, a spiropyran, a quinone, a thiazine or an oxazine or mixtures thereof.

Examples of phthalides are crystal violet lactone (3,3-bis(ρ-dimethylaminophenyl)-6-dimethyl-aminophtalide), 3,3-bis(ρ-dimethylaminophenyl)phthalide, 3,3-bis(1-ethyl-2-methylindol-3-yl)phthalide, 3,3-bis(1-octyl-2-methylindol-3-yl)phthalide, 3-(4-diethylaminophenyl)-3-(1-ethyl-2-methylindol-3-yl)-phthalide, 7-(N-ethyl-N-isopentylamino)-3-methyl-1-phenyl-spiro[4H-chromeno[2,3-c]pyrazole-4 (1H)-3' phthalide, 3,6,6'-tris(dimethylamino)spiro-[fluorene-9,3'-phthalide], 3,6,6'-tris(diethylamino)spiro[fluorene-9,3'-phthalide], 3,3-bis-[2-(ρ-dimethylaminophenyl)-2-(ρ-methoxyphenyl)ethenyl-4,5,6,7-tetrabromophthalide, 3,3-bis[2-(ρ-dimethylaminophenyl)-2-(ρ-methoxyphenyl)ethenyl-4,5,6,7-tetrachlorophthalide, 3,3-bis[1,1-bis(4-pyrrolidinophenyl)ethylene-2-yl]-4,5,6,7-tetrabromophthalide, 3,3-bis-[1-(4-methoxyphenyl)-1-(4-pyrridinophenyl)ethylene-2-yl]-4,5,6,7-tetrachlorophthalide, 3-(4-diethylamino-2-ethoxyphenyl)-3-(1-ethyl-2-methylindol-3-yl)-4-azaphthalide, 3-(4-diethylamino-2-ethoxyphenyl)-3-(1-octyl-2-methylindol-3-yl)-4-azaphthalide and 3-(4-cyclo-hexylethylamino-2-methoxyphenyl)-3-(1-ethyl-2-methylindol-3-yl)-4-azaphthalide The phthalides can be prepared by methods known in the art, for example crystal violet lactone can be prepared as described in GB 1,347,467, and 3,3-bis(1-ethyl-2-methylindol-3-yl)phthalide can be prepared as described in GB 1,389,716.

Examples of fluorans are 3-di(ethyl)amino-6-methyl-7-(tert-butoxycarbonyl)anilinofluoran, 3-diethylamino-7-dibenzylamino)fluoran, 3-dibutylamino-7-dibenzylaminofluoran, 3-diethylamino-6-methyl-7-(dibenzylamino)fluoran, 3-diethylamino-6-methylfluoran, 3-diethylamino-6-chloro-7-methylfluoran, 3-diethylamino-6-methyl-7-chlorofluoran, 3-diethylamino-7-tert-butylfluoran, 3-diethylamino-7-ethylcarboxyfluoran, 3-diethylamino-7-methylfluoran, 3-diethylamino-6,8-dimethylfluoran, 3-diethylamino-7-chlorofluoran, 3-dibutylamino-6-methylfluoran, 3-cyclohexylamino-6-chlorofluoran, 3-diethylamino-benzo[a]fluoran, 3-diethylamino-benzo[c]fluoran, 3-dimethylamino-6-methyl-7-anilinofluoran, 3-diethylamino-6-methyl-7-anilinofluoran, 3-diethylamino-6-methyl-7-(2,4-dimethylanilino)fluoran, 3-diethylamino-6-methyl-7-(3-trifluoromethylanilino)fluoran, 3-diethylamino-6-methyl-7-(2-chloroanilino)-fluoran, 3-diethylamino-6-methyl-7-(ρ-chloroanilino)fluoran, 3-diethylamino-6-methyl-7-(2-fluoroanilino)fluoran, 3-diethylamino-6-methyl-7-(ρ-octylanilino)fluoran, 3-diethylamino-7-(ρ-octylanilino) fluoran, 3-diethylamino-6-methyl-7-(ρ-methylanilino)fluoran, 3-diethylamino-6-ethoxyethyl-7-anilinofluoran, 3-diethylamino-6-methyl-7-(3-methylanilino)fluoran, 3-diethylamino-7-(3-trifluoromethylanilino)fluoran, 3-diethylamino-7-(2-chloroanilino)fluoran, 3-diethyl-amino-7-(2-fluoroanilino)fluoran, 3-diethylamino-6-chloro-7-anilinofluoran, 3-dibutylamino-6-methyl-7-anilinofluoran, 3-dibutylamino-6-methyl-7-(2,4-dimethylanilino)fluoran, 3-dibutylamino-6-methyl-7-(2-chloroanilino)fluoran, 3-dibutylamino-6-methyl-7-(4-chloroanilino)-fluoran, 3-dibutylamino-6-methyl-7-(2-fluoroanilino)fluoran, 3-dibutylamino-6-methyl-7-(3-tri-fluoromethylanilino)fluoran, 3-dibutylamino-6-ethoxyethyl-7-anilinofluoran, 3-dibutylamino-6-chloro-anilinofluoran, 3-dibutylamino-6-methyl-7-(4-methylanilino)fluoran, 3-dibutylamino-7-(2-chloroanilino)fluoran, 3-dibutylamino-7-(2-fluoroanilino) fluoran, 3-dipentylamino-6-methyl-7-anilinofluoran, 3-dipentylamino-6-methyl-7-(4-2-chloroanilino)fluoran, 3-dipentylamino-7-(3-trifluoromethylanilino)fluoran, 3-dipentylamino-6-chloro-7-anilinofluoran, 3-dipentylamino-7-(4-chloroanilino)fluoran, 3-pyrrolidino-6-methyl-7-anilinofluoran, 3-piperidino-6-methyl-7-anilinofluoran, 3-(N-methyl-N-propylamino)-6-methyl-7-anilinofluoran, 3-(N-methyl-N-cyclohexylamino)-6-methyl-7-anilinofluoran, 3-(N-ethyl-N-cyclohexylamino)-6-methyl-7-anilinofluoran, 3-(N-ethyl-N-hexylamino)-7-anilinofluoran, 3-(N-ethyl-ρ-toluidino)-amino-6-methyl-7-anilinofluoran, 3-(N-ethyl-ρ-toluidino)amino-7-methylfluoran, 3-(N-ethyl-N-isoamylamino)-6-methyl-7-anilinofluoran, 3-(N-ethyl-N-isoamylamino)-7-(2-chloroanilino)-fluoran, 3-(N-ethyl-N-isoamylamino)-6-chloro-7-anilinofluoran, 3-(N-ethyl-N-tetrahydrofurfuryl-amino)-6-methyl-7-anilinofluoran, 3-(N-ethyl-N-isobutylamino)-6-methyl-7-anilinofluoran, 3-(N-butyl-N-isoamylamino)-6-methyl-7-anilinofluoran, 3-(N-isopropyl-N-3-pentylamino)-6-methyl-7-anilinofluoran, 3-(N-ethyl-N-ethoxypropylamino)-6-methyl-7-anilinofluoran, 2-methyl-6-ρ-(ρ-dimethylaminophenyl)aminoanilinofluoran, 2-methoxy-6-ρ-(ρ-dimethyl-aminophenyl)aminoanilinofluoran, 2-chloro-3-methyl-6-ρ-(ρ-phenylaminophenyl)aminoanilinofluoran, 2-diethylamino-6-ρ-(ρ-dimethylaminophenyl)aminoanilinofluoran, 2-phenyl-6-methyl-6-ρ-(ρ-phenylaminophenyl)aminoanilinofluoran, 2-benzyl-6-ρ-(ρ-phenylamino-phenyl)aminoanilinofluoran, 3-methyl-6-ρ-(ρ-dimethylaminophenyl)aminoanilinofluoran, 3-diethylamino-6-ρ-(ρ-diethylaminophenyl)aminoanilinofluoran, 3-diethylamino-6-ρ-(ρ-dibutyl-aminophenyl)aminoanilinofluoran and 2,4-dimethyl-6-[(4-dimethylamino)anilino]fluoran.

The fluorans can be prepared by methods known in the art, for example 3-diethylamino-7-di-benzylaminofluoran, 3-diethylamino-7-tert-butylfluoran, 3-diethylamino-6-methyl-7-anilinofluoran and 3-diethylamino-6-methyl-7-(2,4-dimethylanilino)fluoran and can be prepared as described in U.S. Pat. No. 5,166,350 A, 3-diethylamino-6-methyl-7-(3-methylanilino)fluoran can be prepared as described in EP 0 546 577 A1,3-diethylamino-6-chloro-7-anilinofluoran can be prepared as described in DE 2130845, 3-pyrrolidino-6-methyl-7-anilinofluoran and 3-piperidino-6-methyl-7-anilinofluoran can be prepared as described in U.S. Pat. No. 3,959,571 A, 3-(N-ethyl-N-isoamylamino)-6-methyl-7-anilinofluoran can be prepared as described in GB 2 002 801 A, and 3-(N-methyl-N-propylamino)-6-methyl-7-anilinofluoran can be prepared as described in GB 2 154 597 A.

Examples of benzoxazines are 2-phenyl-4-(4-diethylaminophenyl)-4-(4-methoxyphenyl)-6-methyl-7-dimethylamino-3,1-benzoxazine, which can be prepared as described in EP 0 187 329 A1, and 2-phenyl-4-(4-diethylaminophenyl)-4-(4-methoxyphenyl)-8-methyl-7-dimethylamino-3,1-benzoxazine.

An example of a quinazoline is 4,4'41-methylethylidene)bis(4,1-phenyleneoxy-4,2-quina-zolinediyl)]bis[N,N-diethylbenzeneamine]. An example of a triarylmethane is bis(N-methyldi-phenylamine)-4-yl-(N-butylcarbazole)-3-yl-methane, which can be prepared as described in GB 1,548,059.

Examples of spiropyrans are 1',3',3'-trimethylspiro[2H-1-benzopyran-2,2'-indoline], 1,3,3-tri-methylspiro[indoline-2,3'-[3H]naphth[2,1-b][1,4]oxazine] and 1',3',3'-trimethyl-spiro-[2H-1-benzothiopyran-2,2'-indoline].

An example of a quinone is hematoxyline. An example of an oxazine is 3,7-bis(dimethyl-amino)-10-benzoylphenoxazine. An example of a thiazine is 3,7-bis(dimethylamino)-10-benzoylphenothiazine.

Preferably, the colour former is a phthalide or a fluoran or mixtures thereof.

More preferably, the colour former is 3,3-bis(1-octyl-2-methylindol-3-yl)phthalide as sold for example under the tradename Ciba® Pergascript® Red 1-6B, 3-dibutylamino-6-methyl-7-anilinofluoran as sold for example under the tradename Ciba® Pergascript® Black T-2R or 3-diethylamino-7-ethylcarboxyfluoran as sold for example under the tradename Ciba® Pergascript® Black I-R.

The coating composition can also comprise a binder or a mixture of binders.

Examples of binders are polyvinyl alcohol (fully or partially hydrolysed), sulfonated-polyvinyl alcohol, carboxy-modified polyvinyl alcohol, acetoacetyl-modified polyvinyl alcohol, diacetone-modified polyvinyl alcohol, silicon-modified polyvinyl alcohol, oxidised starch, gelatine, caesin, derivatives of cellulose such as hydroxyethyl cellulose, methyl cellulose, ethyl cellulose, carboxymethyl cellulose and acetyl cellulose, starch-vinyl acetate graft copolymers, styrene-maleic anhydride copolymers, methyl vinyl ether-maleic anhydride copolymers, isopropylene-maleic anhydride copolymers and like water-soluble resins, styrene-butadiene latex, acrylic latex, urethane latex and like water-dispersible resins and mixtures thereof.

Preferred binders are polyvinyl alcohol (fully or partially hydrolysed), sulfonated-polyvinyl alcohol and acrylic latex and mixtures thereof. More preferably, the binder is polyvinyl alcohol.

The coating composition can comprise an aqueous medium. Usually the aqueous medium is water or a mixture of water and a water-miscible organic solvent. Preferably, the aqueous medium is water.

Examples of water-miscible organic solvents are $C_{1-4}$-alkanols, $C_{2-4}$-polyols, $C_{3-6}$-ketones, $C_{4-6}$-ethers, $C_{2-3}$-nitriles, nitromethane, dimethylsulfoxide, dimethylformamide, dimethyl-acetamide, N-methylpyrolidone and sulfolane, whereby $C_{1-4}$-alkanols and $C_{2-4}$-polyols may be substituted with $C_{1-4}$-alkoxy. Examples of $C_{1-4}$-alkanols are methanol, ethanol, propanol, isopropanol, butanol, isobutanol, sec-butanol and tert-butanol. Examples of $C_{1-4}$-alkoxy-derivatives thereof are 2-ethoxyethanol and 1-methoxy-2-propanol. Examples of $C_{2-4}$-polyols are glycol and glycerol. Examples of $C_{3-6}$-ketones are acetone and methyl ethyl ketone. Examples of $C_{4-6}$-ethers are dimethoxyethane, diisopropylether and tetrahydrofurane. An example of a $C_{2-3}$-nitrile is acetonitrile. Ethanol and isopropanol are preferred water-miscible organic solvents.

The coating composition can comprise a dispersing agent. Example of a dispersing agent are sodium naphthalene sulfonate, polymer with formaldehyde, and polyacrylic acid, sodium salt as sold for example under the tradename Ciba® Dispex® N40.

The coating composition can comprise a surfactant. Examples of surfactants are sodium dioctylsulfosuccinate, sodium dodecybenzenesulfonate, sodium lauryl sulfate, fatty acid metal salts and 2,4,7,9-tetramethyl-dec-5-in-4,7-diol (sold for example under the tradename Surfynol® 104).

The coating composition can also comprise additional components such as sensitizers, lubricants, pigments, stabilizers, insolubilisers, fluorescent whitening agents, wetting agents, IR absorbers, UV absorbers, antifoaming agents, fluorescent dyes, fluorescent pigment and tinting dyes.

Examples of sensitiser are benzyloxynaphthylene, stearamide, methylol stearamide, p-benzylbiphenyl, m-terphenyl, benzyl-2-naphthyl ether, 4-methoxybiphenyl, dibenzyl oxalate, di(4-methylbenzyl) oxalate, di(4-chlorobenzyl) oxalate, dimethyl terephthalate, dibenzyl terephthalate, dibenzyl isophthalate, 1,2-diphenoxyethane, 1,2-bis(4-methyl-phenoxy)ethane, 1,2-bis(3-methylphenoxy)ethane, 4,4'-dimethylbiphenyl, phenyl-1-hydroxy-2-naphthoate, 4-methylphenyl biphenyl ether, 1,2-bis(3,4-dimethylphenyl)ethane, 1,4-di-ethoxynaphthalene, o-xylylene-bis(phenyl ether), 4-(m-methylphenoxymethyl) biphenyl, p-hydroxyacetanilide, p-hydroxybutyranilide, p-hydroxynonananilide, p-hydroxylauranilide, p-hydroxyoctadecananilide, N-phenylphenylsulfonamide and 2-phenoxyethyl-N-phenyl-carbamate. A preferred sensitizer is benzyloxynaphthylene.

Examples of lubricants are stearamide, methylene bis stearamide, polyethylene wax, carnauba wax, paraffin wax, zinc stearate, calcium stearate and mixtures thereof. A preferred lubricant is zinc stearate.

Examples of pigments are ground calcium carbonate, precipitated calcium carbonate, kaolin, calcined kaolin, aluminium hydroxide, talc, titanium dioxide, zinc oxide, amorphous silica, barium sulfate, polystyrene resin, urea-formaldehyde resin, hollow plastic pigment and mixtures thereof. Preferred pigments are ground calcium carbonate, precipitated calcium carbonate, amorphous silica and aluminium hydroxide. Calcium carbonate is the preferred pigment.

Examples of stabilisers are 2,2'-methylene-bis(4-methyl-6-tert-butylphenol), 2,2'-methylene-bis(4-ethyl-6-tert-butylphenol), 4,4'-butylidene-bis(3-methyl-6-tert-butylphenol), 4,4'-thio-bis(2-tert-butyl-5-methylphenol), 1,1,3-tris(2-methyl-4-hydroxy-5-tert-butylphenyl) butane, 1,1,3-tris(2-methyl-4-hydroxy-5-cyclohexylphenyl) butane, bis(3-tert-butyl-4-hydroxy-6-methylphenyl) sulfone, bis(3,5-dibromo-4-hydroxyphenyl) sulfone, 4,4'-sulfinyl bis(2-tert-butyl-5-methylphenol), 2,2'-methylene bis(4,6-di-tert-butylphenyl) phosphate and alkali metal, ammonium and polyvalent metal salts thereof, 4-benzyloxy-4'-(2-methylglycidyloxy) diphenyl sulfone, 4,4'-diglycidyloxydiphenyl sulfone, 1,4-diglycidyloxybenzene, 4[α-(hydroxylmethyl)benzyloxy]-4-hydroxydiphenyl sulfone, metal salts of p-nitrobenzoic acid, metal salts of phthalic acid mono benzyl ester, metal salts of cinnamic acid and mixtures thereof.

Examples of insolubilisers are glyoxal, urea-formaldehyde resins, melamine-formaldehyde resins, polyamide resins, polyamido-epichlorohydrin resins, adipic acid dihydrazide, boric acid, borax, ammonium zirconium carbonate, potassium zirconium carbonate and ammonium zirconium lactate.

Examples of fluorescent whitening agents are stilbene derivatives such as sold, for example, under the tradenames Ciba® Tinopal® SPP-Z or Ciba® Tinopal® ABP-Z.

An example of a wetting agent is Ciba® Irgaclear® D, a sorbitol based clarifying agent.

Examples of IR absorbers are alkylated triphenyl phosphorothionates, for example as sold under the trade name Ciba® Irgalube® 211. Examples of a UV absorber are Ciba® Tinuvin® 900 and Ciba® Tinuvin® 1130, which are UV absorbers of the hydroxyphenyl benzotriazole class and Ciba® Tinuvin® 400 and Ciba® Tinuvin® 1577, which are UV absorbers of the triaryltriazine class.

Examples of tinting colorants are Ciba® Pergasol® Violet BN and Ciba® Irgalite® Violet M.

The coating composition can comprise the colour developer of formula 1 or mixtures thereof from 0.1 to 25% by weight based on the weight of the coating composition, preferably from 0.5 to 15% by weight, more preferably from 1 to 10% by weight.

The coating composition can comprise the colour former or mixtures thereof from 0.1 to 25% by weight based on the weight of the coating composition, preferably from 0.5 to 15% by weight, more preferably from 1 to 10% by weight.

The coating composition can comprise the binder or mixtures thereof from 1 to 60% by weight based on the weight of the coating composition, preferably from 5 to 30% by weight, more preferably from 8 to 25% by weight.

The coating composition can comprise the aqueous medium from 1 to 99% by weight based on the weight of the coating composition, preferably from 25 to 95% by weight, more preferably from 40 to 90% by weight.

The coating composition can comprise the dispersing agent from 0.001 to 10% by weight based on the weight of the coating composition, preferably from 0.01 to 5% by weight, more preferably from 0.05 to 1% by weight.

The coating composition can comprise the surfactant from 0.001 to 10% by weight based on the weight of the coating composition, preferably from 0.01 to 5% by weight, more preferably from 0.01 to 1% by weight.

The coating composition can comprise additional components from 0 to 50% by weight of all additional components based on the weight of the coating composition, preferably from 0 to 25% by weight.

Preferably, the coating composition essentially consists of a colour developer of formula 1 or mixtures thereof, a colour former or mixtures thereof, a binder or mixtures thereof and an aqueous medium.

Generally, the weight ratio of colour developer to colour former is chosen in the range of from 1:5 to 5:1, preferably from 3:1 to 1:3.

Also part of the invention is a process for preparing the coating composition of the present invention. This process comprises mixing the colour developer 1 or mixtures thereof with a colour former or mixtures thereof, and optionally a binder or mixtures thereof, an aqueous medium, a dispersing agent, a surfactant and additional components. For example, the colour developer 1 and the colour former are milled separately in an aqueous medium and/or a binder by means of e.g. a ball mill, an attritor, a sand mill, a bead mill or like device to form dispersions with an average particle diameter preferably in the range of 0.2 to 2.0 µm. The fine particle dispersions thus obtained can be combined and then optionally mixed with binder, aqueous medium, a dispersing agent, a surfactant and additional components. The resulting mixture is thoroughly stirred to obtain the heat sensitive coating composition.

A process for preparing a substrate coated with the coating composition of the present invention is also part of the invention. This process comprises coating a substrate with the coating composition of the present invention.

The substrate can be a sheet or any other three dimensional object, it can be transparent or opaque and it can have an even or uneven surface. The substrate can be paper, cardboard, metal, wood, textiles, glass, ceramics and/or polymers. Examples of paper are wood-free paper made from non-chlorine bleached pulp and base paper containing waste paper. Examples of polymers are polyethylene terephthalate, low density-polyethylene, polypropylene, biaxially orientated polypropylene, polyether sulfone, polyvinyl chloride, polyester and polystyrene. Preferably, the substrate is paper, cardboard or polymer. More preferably, it is paper.

The substrate can be coated with the composition of the present invention by using a standard coating application such as a bar coater application, rotation application, spray application, curtain application, dip application, air application, knife application, blade application or roll application. The composition can also be applied to the substrate by various printing methods such as silk screen printing, gravure printing, offset printing and flexo printing. If the substrate is paper, the composition can also be applied in the size press or at the wet-end of the paper machine.

The coating composition can be dried, for example at ambient or elevated temperature. The elevated temperature is ideally chosen to avoid image formation before exposure to heat. The coating can have a weight of 1 to 10 $g/m^2$, preferably from 2 to 7 $g/m^2$ on a dry weight basis.

Also part of the invention is the substrate coated with the coating composition of the present invention.

Also part of the invention is a process for preparing a marked substrate, which comprises the steps of i) coating a substrate with the coating composition of the present invention, and ii) exposing those parts of the coated substrate, where a marking is intended, to heat in order to generate a marking.

The heat can be applied using a thermal printer or electromagnetic irradiation such as UV, IR, visible or microwave irradiation. UV, visible and IR irradiation can be applied by using a UV, visible or IR laser. Examples of IR lasers are $CO_2$ lasers, Nd:YAG (neodym-yttrium-aluminum garnet) lasers and IR semiconductor lasers.

Preferably, the heat is applied by using a thermal printer or a laser. More preferably, the heat is applied using a thermal printer or an IR laser having a wavelength in the range of 780 to 1,000,000 nm. Even more preferably, the heat is applied using a thermal printer or a $CO_2$ laser.

Typically the exact power of the IR laser and the line speed is determined by the application and chosen to be sufficient to generate the image, for example, when the wavelength of the IR laser is 10,600 nm and the diameter of the laser beam is 0.35 mm, the power is typically 0.1 to 4 W, and the line speed is typically 500 to 2,000 mm/s.

Yet another aspect of the invention is the marked substrate, which is obtained by above process.

Also parts of the present invention are the colour developers of formulae

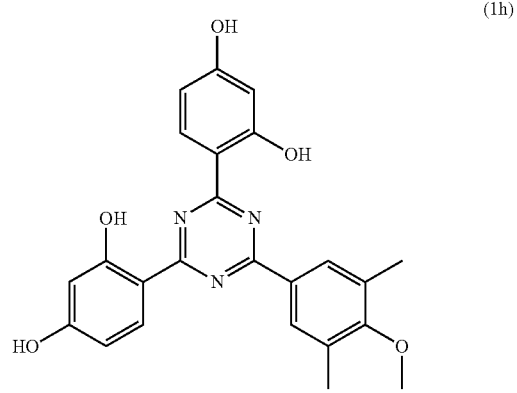

(1h)

-continued

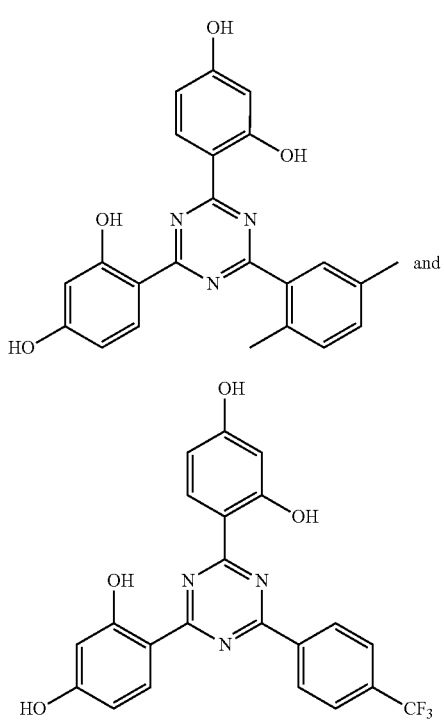

(1k) and (1l)

The coating compositions of the present invention have the advantage that they are storage stable, i.e. only undergo minimal darkening (yellowing) upon storage in the wet state at room temperature or even slightly elevated temperature, and which also provide images of high contrast and of high stability towards heat, oil and light.

EXAMPLES

Example 1

Preparation of Dispersions A to D

The following dispersions A to D are prepared by milling the compositions shown below in an attritor until a particle size of ~1.0 micron is obtained.

Dispersion A

| 25 parts | colour developer of formulae 1a, 1b, 1c, 1d, 1e, 1f, 1g, 1h, 1i, 1j, 1k, 1l, 1m, 1n, 1o, 1p, 1q, 1r, 1s, 1, 1u, 1v, 1w, 1x or 1y, respectively 1/1 (weight/weight) mixture of 1a and 1p. |
| --- | --- |
| 16.7 parts | polyvinyl alcohol (10%) |
| 1.5 parts | naphthylene sulfonic acid formaldehyde condensate (45%) |
| 57 parts | deionised water |

Dispersion B

| 25 parts | color former 2 (see table 2 below) |
| --- | --- |
| 50 parts | polyvinyl alcohol (10%) |
| 0.75 parts | Surfynol ® 104, 2,4,7,9-tetramethyl-dec-5-in-4,7-diol (20%) |
| 24 parts | deionised water |

TABLE 2

| Color Former | |
| --- | --- |
| 2a | 3-dibutylamino-6-methyl-7-anilinofluoran |
| 2b | 3,3-bis(1-octyl-2-methylindole-3-yl)phthalide |
| 2c | 3-diethylamino-7-ethylcarboxyfluoran |
| 2d | 3-(ethyl-(3-methylbutyl)amino)-6-methyl-7-anilinofluoran |
| 2e | 3-diethylamino-6-methyl-7-(2,4-dimethylanilino)fluoran |
| 2f | 3-diethylamino-6-methyl-7-anilinofluoran |
| 2g | 3-diethylamino-6-methyl-7-(4-methylanilino)fluoran |
| 2h | 3-(1-octyl-2-methylindole-3-yl)-3-(2-(1-ethoxy-2-diethylaminophenyl))phthalide |

Dispersion C

| 25 parts | benzyloxynaphthylene (BON) |
| --- | --- |
| 8.3 parts | polyvinyl alcohol (10%) |
| 1 part | naphthylene sulfonic acid formaldehyde condensate (45%) |
| 66 parts | deionised water |

Dispersion D

| 25 parts | calcium carbonate |
| --- | --- |
| 0.25 part | Ciba ® Dispex ® N40, a polyacrylic acid, sodium salt (40%) |
| 75 parts | deionised water |

Example 2

Preparation of a Coating

A coating composition is prepared containing the following components:

| 2.88 g | Dispersion A (1a to 1d) |
| --- | --- |
| 1.44 g | Dispersion B (2a) |
| 2.40 g | Dispersion C |
| 7.88 g | Dispersion D |
| 1.45 g | zinc stearate (17%) |
| 2.2 g | polyvinyl alcohol (20%) |
| 0.1 g | Tinopal ™ ABP-Z, a stilbene-based fluorescent whitening agent |
| 1.15 g | deionized water |

The coating composition is applied to a base paper using a drawdown coater, dried and calendered to provide coatweights of 5.6 to 6.0 g/m². The papers are printed with an Atlantek thermal printer to provide black images of good stability. The optical density of the papers and resulting images are measured with a GretagMacbeth SpectroEye spectrometer.

TABLE 3

| | Optical density | |
| --- | --- | --- |
| Dispersion A | before printing | after printing |
| 1a | 0.20 | 0.81 |
| 1b | 0.14 | 1.02 |
| 1c | 0.56 | 0.62 |
| 1d | 0.17 | 0.88 |

Example 3

Preparation of a Coating

A coating composition based on Dispersion A (1b) is prepared as described in example 2, but with varying amounts of Dispersion C. The coating compositions are applied to a base paper using a drawdown coater, dried and calendered to provide coatweights of 5.6 to 6.0 g/m². The papers are printed with an Atlantek thermal printer to provide black images of good stability. The optical density of the papers and resulting images are measured with a GretagMacbeth SpectroEye spectrometer.

TABLE 4

| Dispersion C [g] | Optical density | |
|---|---|---|
| | before printing | after printing |
| 2.4 | 0.12 | 1.02 |
| 1.2 | 0.13 | 1.09 |
| 0.6 | 0.12 | 1.06 |
| 0 | 0.17 | 0.62 |

The same samples are then irradiated with a carbon dioxide laser (0.2 W/1000 mm/s) to provide images whose optical densities are also measured with the GretagMacbeth SpectroEye spectrometer.

TABLE 5

| Dispersion C [g] | Optical density | |
|---|---|---|
| | before irradiation | after irradiation |
| 2.4 | 0.12 | 1.06 |
| 1.2 | 0.13 | 1.13 |
| 0.6 | 0.12 | 1.17 |
| 0 | 0.17 | 1.11 |

Example 4

Preparation of a Coating

A coating composition based on Dispersion A (1b) and Dispersion B (2a to 2c) is prepared as described in example 2, but no Dispersion C is present. The coating compositions are applied to a base paper using a drawdown coater, dried and calendered to provide coatweights of 5.6 to 6.0 g/m². The papers are printed with an Atlantek thermal printer to provide black images of good stability. The optical density of the papers and resulting images is measured with a GretagMacbeth SpectroEye spectrometer.

TABLE 6

| Dispersion B | Optical density | |
|---|---|---|
| | before printing | after printing |
| 2a | 0.07 | 0.75 |
| 2b | 0.07 | 0.43 |
| 2c | 0.06 | 0.12 |

The same samples are then irradiated with a carbon dioxide laser (0.2 W/1000 mm/s) to provide images whose optical density is also measured with the GretagMacbeth SpectroEye spectrometer.

TABLE 7

| Dispersion B | Optical density | |
|---|---|---|
| | before irradiation | after irradiation |
| 2a | 0.07 | 0.64 |
| 2b | 0.07 | 0.43 |
| 2c | 0.06 | 0.13 |

Example 5

Preparation of a Coating

A coating composition is prepared containing the following components:

| | |
|---|---|
| 6.28 g | acrylic binder prepared as decribed in example 1B of WO 2007/031454. |
| 6.25 g | Dispersion A (1b) |
| 6.25 g | Dispersion B (2a to 2c) |
| 5.26 g | deionized water |

The coating composition is applied to a base paper using a drawdown coater, dried and calendered to provide coatweights of 5.6 to 6.0 g/m². The papers are then irradiated with a carbon dioxide laser (0.2 W/1000 mm/s) to provide images whose optical density is measured with the GretagMacbeth SpectroEye spectrometer.

TABLE 8

| Dispersion B | Optical density | |
|---|---|---|
| | before irradiation | after irradiation |
| 2a | 0.04 | 0.62 |
| 2b | 0.04 | 0.50 |
| 2c | 0.08 | 0.13 |

Example 6

Preparation of a Coating

Coating compositions based on Dispersion A (1a, 1b, 1d to 1y, 1/1 (weight/weight) mixture of 1a and 1p) and Dispersion B (2a) are prepared as described in example 5. The coating compositions are applied to paper and irradiated as described in example 5. The coating compositions are applied to the paper immediately after preparation, unless indicated otherwise (see footnotes to table 9).

TABLE 9

| Dispersion A | Optical density | |
|---|---|---|
| | before irradiation | after irradiation |
| 1a | 0.29 | 0.85 |
| 1b | 0.14 | 0.55 |
| 1b[1] | 0.17 | 0.86 |
| 1b[2] | 0.18 | 0.82 |
| 1d | 0.24 | 0.63 |
| 1e | 0.37 | 0.47 |
| 1f | 0.41 | 1.40 |
| 1g | 0.64 | 1.15 |
| 1h | 0.29 | 1.36 |
| 1i | 0.28 | 1.41 |
| 1j | 0.15 | 0.96 |
| 1k | 0.32 | 1.58 |
| 1l | 0.94 | 1.28 |

TABLE 9-continued

| Dispersion A | Optical density | |
|---|---|---|
| | before irradiation | after irradiation |
| 1m | 0.52 | 1.22 |
| 1n | 0.29 | 0.55 |
| 1o[3] | 0.05 | 0.29 |
| 1p | 0.04 | 1.00 |
| 1q | 0.04 | 0.61 |
| 1r | 0.41 | 0.75 |
| 1s | 0.16 | 0.68 |
| 1t | 0.06 | 0.63 |
| 1u | 0.09 | 0.83 |
| 1v | 0.05 | 0.05 |
| 1w | 0.04 | 0.48 |
| 1x | 0.44 | 0.87 |
| 1y | 0.09 | 0.21 |
| 1a + 1p | 0.04 | 0.38 |

[1]The composition is stored for one week at room temperature before application to paper and laser irradiation.
[2]The composition is stored for one week at 40° C. before application to paper and laser irradiation.
[3]Only one third of the amount specified added to coating.

As can be seen, the coating compositions of the present invention can be stored under various conditions without significant change in activity. Images of high stability against dry and moist heat, oil and light are obtained. A control coating composition containing methyl 2,4-dihydroxybenzoate instead of colour developer of formulae 1 is prepared in analogy to the samples of example 6. The control coating composition discolors immediately and the coated sheets obtained are gray in color.

Example 7

Preparation of a Coating

Coating compositions based on Dispersion A (1p) and Dispersion B (2a to 2h) are prepared as described in example 5. The coating compositions are applied to paper and irradiated with a carbon dioxide laser (1.0 W/1000 mm/s) to provide images whose optical densities are also measured with the GretagMacbeth SpectroEye spectrometer. The coating compositions are applied to the paper immediately after preparation, unless indicated otherwise (see footnotes to table 10).

TABLE 10

| Dispersion B | Optical density | |
|---|---|---|
| | before irradiation | after irradiation |
| 2a | 0.02 | 0.85 |
| 2a[1] | 0.02 | 1.00 |
| 2a[2] | 0.02 | 0.85 |
| 2a[3] | 0.04 | 0.99 |
| 2a[4] | 0.02 | 0.99 |
| 2b | 0.02 | 0.38 |
| 2c | 0.02 | 0.49 |
| 2d | 0.02 | 0.84 |
| 2e | 0.03 | 0.92 |
| 2f | 0.03 | 0.97 |
| 2g | 0.02 | 0.70 |
| 2h | 0.02 | 0.70 |

[1]The composition is stored for one week at room temperature before application to paper and laser irradiation.
[2]The composition is stored for one week at 40° C. before application to paper and laser irradiation.
[3]The composition is stored for four weeks at room temperature before application to paper and laser irradiation.
[4]The composition is stored for four weeks at 40° C. before application to paper and laser irradiation.

As can be seen, the coating compositions of the present invention comprising colour developer 1 p are extraordinary storage stable.

Example 8

Preparation of a Coating

Coating compositions based on Dispersion A (1b) and Dispersion B (2a) are prepared as described in example 5, In addition, the coating compositions contain 0.55 g of the fluorescent whitening agent Ciba® Tinopal® ABP-Z and either 1.56 g of the UV absorbers Ciba® Tinuvin® 900 or Ciba® Tinuvin® 1130. The coating compositions are applied to paper and irradiated as described in example 5.

TABLE 11

| UV Absorber | Optical density | |
|---|---|---|
| | before irradiation | after irradiation |
| Ciba ® Tinuvin ® 900 | 0.15 | 0.72 |
| Ciba ® Tinuvin ® 1130 | 0.15 | 0.70 |

Example 9

Preparation of a Coating

Coating compositions based on Dispersion A (1p) and Dispersion B (2a) are prepared as described in example 5, except that the acrylic binder is replaced with either a styrene butadiene latex or polyvinylalcohol. The coating compositions are applied to paper and irradiated as described in example 5. The coating compositions are applied to the paper immediately after preparation, unless indicated otherwise (see footnotes to table 9).

TABLE 12

| Binder | Optical density | |
|---|---|---|
| | before irradiation | after irradiation |
| Ciba ® Latexia ® 304[1] | 0.04 | 0.94 |
| Ciba ® Latexia ® 318[2] | 0.04 | 0.78 |
| Ciba ® Latexia ® 319[3] | 0.03 | 0.70 |
| Ciba ® Latexia ® 302S | 0.03 | 0.83 |
| Ciba ® Latexia ® 707 | 0.02 | 0.61 |
| Ciba ® Latexia ® 770 | 0.02 | 0.86 |
| Mowiol 26-88[4] | 0.01 | 1.13 |

[1]Ciba ® Latexia ® 304 is a styrene butadiene latex (solids content 50%, particle size 0.15 μm, glass transition temperature Tg 20° C.).
[2]Ciba ® Latexia ® 318 is a styrene butadiene latex (solids content 50%, particle size 0.12 μm, glass transition temperature Tg 22° C.).
[3]Ciba ® Latexia ® 319 is a styrene butadiene latex (solids content 50%, particle size 0.12 μm, glass transition temperature Tg 28° C.).
[4]Mowiol 26-88 is a partially hydrolysed polyvinyl alcohol sold by Kuraray.

The invention claimed is:

1. A coating composition comprising a colour developer of formula

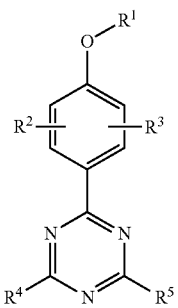

(1)

or mixtures thereof
wherein
R¹ is hydrogen, $C_{1-20}$-alkyl, $C_{3-8}$-cycloalkyl, $C_{2-10}$-alkenyl, or aryl, and
$R^2$ and $R^3$ are the same or different and are hydrogen, halogen, $C_{1-20}$-alkyl, $C_{3-8}$-cycloalkyl, $C_{2-10}$-alkenyl, aryl, $NR^7R^8$, $SR^9$, $SO_3H$ or $COOR^{10}$ and
$R^4$ and $R^5$ are the same or different, and are hydrogen, halogen, $C_{1-20}$-alkyl, $C_{3-8}$-cycloalkyl, $C_{2-10}$-alkenyl, or aryl,
$R^6$, $R^7$, $R^8$, $R^9$ and $R^{10}$ are the same or different and are hydrogen, $C_{1-30}$-alkyl, $C_{3-8}$-cycloalkyl, $C_{2-10}$-alkenyl or aryl,
wherein
$C_{1-20}$-alkyl can be unsubstituted or substituted with one or more $C_{3-8}$-cycloalkyl, $C_{2-10}$-alkenyl, phenyl, halogen, $OR^{11}$, $NR^{12}R^{13}$, $SR^{14}$, $SO_3H$ or $COOR^{15}$, and aryl can be unsubstituted or substituted with one or more halogen, $C_{1-10}$-alkyl, halogenated $C_{1-10}$-alkyl, $C_{3-8}$-cycloalkyl, $C_{2-10}$-alkenyl, phenyl, $OR^{11}$, $NR^{12}R^{13}$, $SR^{14}$, $SO_3H$ or $COOR^{15}$,
wherein
$R^{11}$, $R^{12}$, $R^{13}$, $R^{14}$ and $R^{15}$ are the same or different and are hydrogen, $C_{1-10}$-alkyl, $C_{3-8}$-cycloalkyl or $C_{2-10}$-alkenyl.

2. The coating composition of claim 1, wherein the composition also comprises a colour former or mixtures thereof.

3. A process for preparing the coating composition of claim 2, which process comprises mixing the colour developer of formula 1 or mixtures thereof with a colour former or mixtures thereof.

4. The coating composition of claim 1, wherein the composition also comprises a binder or mixtures thereof.

5. The coating composition of claim 1, wherein the composition also comprises an aqueous medium.

6. The coating composition of claim 1, wherein the composition also comprises a dispersing agent.

7. The coating composition of claim 1, wherein the composition also comprises a surfactant.

8. The coating composition of claim 1, wherein the composition also comprises additional components.

9. A process for preparing a substrate coated with the coating composition of claim 1, which process comprises coating a substrate with the coating composition of claim 1.

10. A substrate coated with the coating composition of claim 1.

11. A process for preparing a marked substrate, which process comprises the steps of i) coating a substrate with the coating composition of claim 1, and ii) exposing those parts of the coated substrate, where a marking is intended, to heat in order to generate a marking.

12. The process of claim 11 wherein the heat is applied using a thermal printer or electromagnetic irradiation.

13. A marked substrate, which is obtained by the process of claim 11.

14. A coating composition according to claim 1, comprising a colour developer of formula (1) or mixtures thereof, wherein
R¹ is hydrogen
$R^2$ and $R^3$ are hydrogen
$R^4$ and $R^5$ can be the same or different, and are aryl, wherein aryl can be substituted with one or more hydroxyl group.

15. A coating composition according to claim 1, wherein the colour developer of formula (1) is

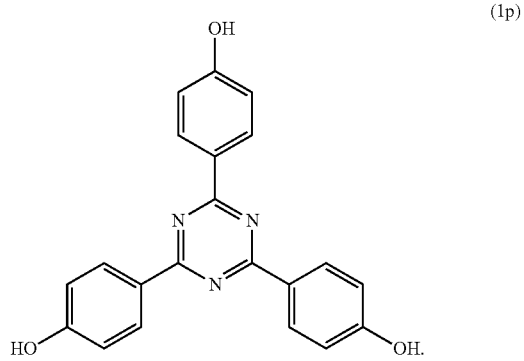 [SMILES: Oc1ccc(-c2nc(-c3ccc(O)cc3)nc(-c3ccc(O)cc3)n2)cc1]

(1p)

16. Compound of formula

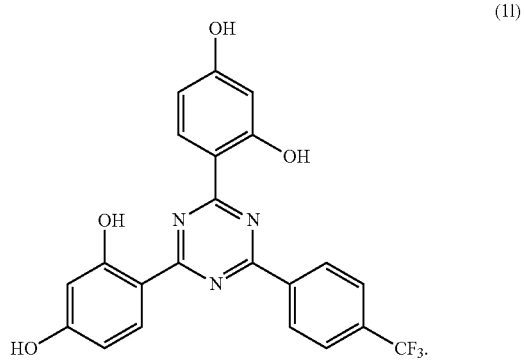 [SMILES: Oc1ccc(-c2nc(-c3ccc(C(F)(F)F)cc3)nc(-c3ccc(O)cc3O)n2)c(O)c1]

(1l)

17. A coating composition comprising a colour developer of the formula

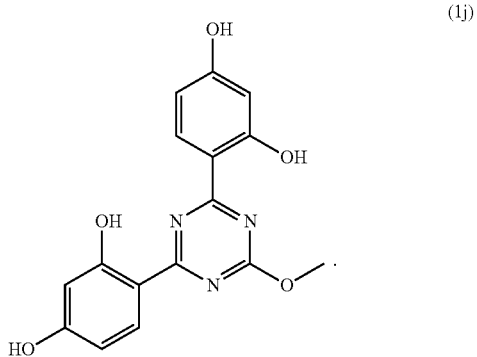 [SMILES: COc1nc(-c2ccc(O)cc2O)nc(-c2ccc(O)cc2O)n1]

(1j)

18. A coating composition comprising a colour developer of the formula

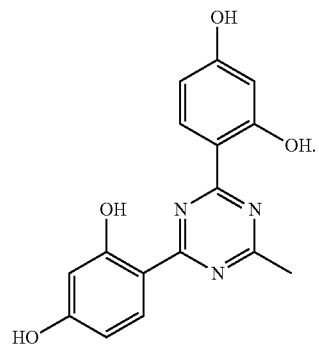
(1n)

19. A coating composition comprising a colour developer of the formula

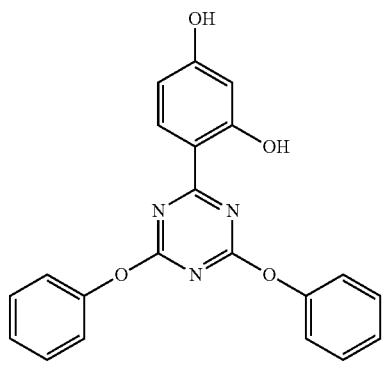
(1o)

and a colour former or mixture of colour formers.

20. A coating composition comprising a colour developer of the formula

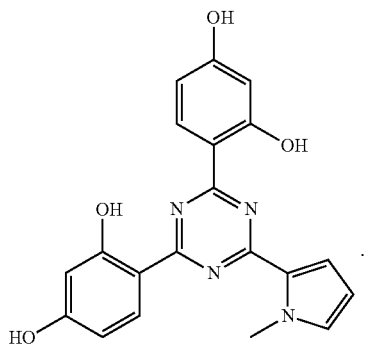
(1r)

21. A coating composition comprising a colour developer of the formula

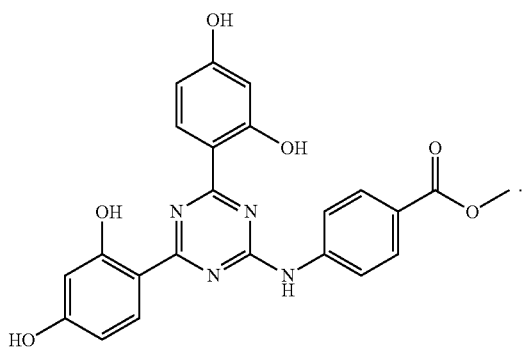
(1s)

22. A coating composition comprising a colour developer of the formula

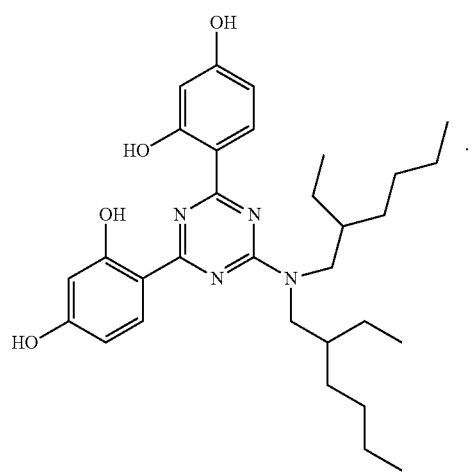
(1t)

23. A coating composition comprising a colour developer of the formula

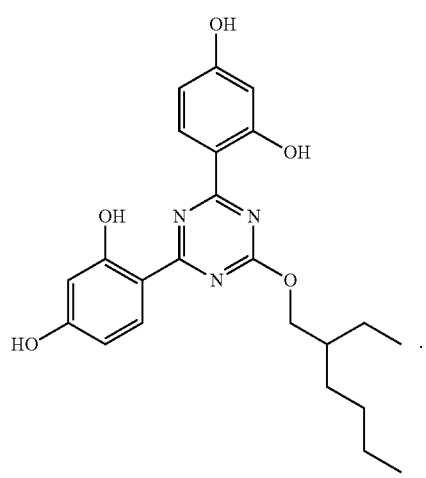
(1u)

24. A coating composition comprising a colour developer of the formula
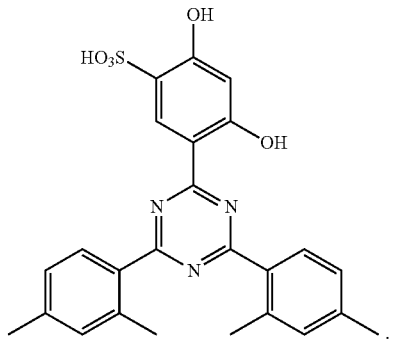
(1w)
25. A coating composition comprising a colour developer of the formula
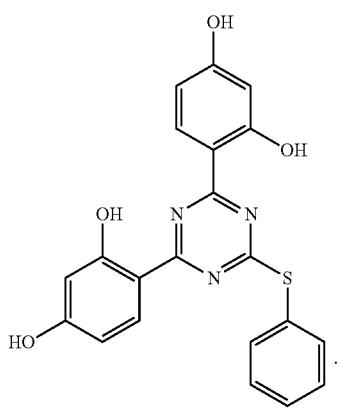
(1x)
26. A coating composition comprising a colour developer of the formula
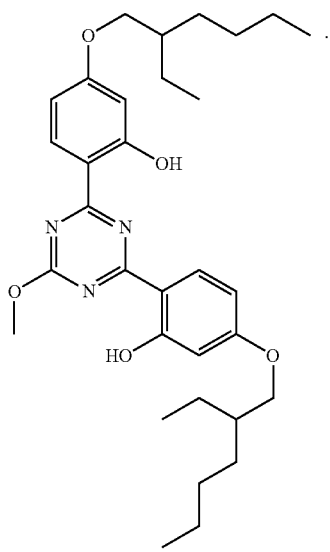
(1y)
* * * * *